C. E. EGNÉR & J. G. HOLMSTRÖM.
TELEPHONE TRANSMITTER.
APPLICATION FILED FEB. 18, 1909.

938,992.

Patented Nov. 2, 1909.

Witnesses

Inventors
Carl Emil Egnér,
Johan Gunnar Holmström
By
Attorney

UNITED STATES PATENT OFFICE.

CARL EMIL EGNÉR, OF STOCKHOLM, AND JOHAN GUNNAR HOLMSTRÖM, OF SALTSJÖ-STORÄNGEN, SWEDEN.

TELEPHONE-TRANSMITTER.

938,992. Specification of Letters Patent. Patented Nov. 2, 1909.

Application filed February 18, 1909. Serial No. 478,684.

*To all whom it may concern:*

Be it known that we, CARL EMIL EGNÉR, a subject of the King of Sweden, and resident of Stockholm, in the Kingdom of Sweden, and JOHAN GUNNAR HOLMSTRÖM, a subject of the King of Sweden, and resident of Saltsjö-Storängen, in the Kingdom of Sweden, have invented certain new and useful Improvements in Telephone-Transmitters, of which the following is a specification, reference being had therein to the accompanying drawing.

As ordinary diaphragms jammed or fixed at their edges are caused to vibrate, they vibrate in a very irregular manner substantially due to the fact that the diaphragm is subjected to different strains at different points, the diaphragm being divided into irregular fields in which the amplitudes of the vibrations are different. Generally the field, in which the amplitude is greatest, is situated at some distance from the center of the diaphragm. This fact, evidently, is a great drawback in telephone-transmitters, as the diaphragm of the transmitter, coöperating with the contact-pieces located at the center part of the diaphragm, then does not effect the greatest possible variations in the current. If, on the other hand, the diaphragm is so strained, that all parts are stretched uniformly from the center of the diaphragm radially outward, the field with the greatest vibrations will always be located at the center of the diaphragm, as proved by the practice. For that reason diaphragms so strained are very suitable for transmitters. The straining of the diaphragm, however, is not alone sufficient to produce the best effect. As stated above, the greatest vibrations are at the center of the diaphragm and the amplitude decreases toward the periphery of the same. In transmitters consisting of carbon granules mounted in a cell inside the diaphragm and bearing against the same, not the granules at the center of the diaphragm but the granules of the cell located at the greatest distance from the center of the diaphragm will for the reasons stated above, control the variations of the current. Consequently a better effect will, evidently, be gained, if a second diaphragm, disk or the like is fixed to the center of the said strained diaphragm, the said disk, acting upon the carbon granules of the transmitter and having the same or substantially the same diameter as the cell of the transmitter and vibrating at all its points with the same amplitude as the center of the diaphragm.

One form of the invention is shown in the accompanying drawing.

Figure 1:
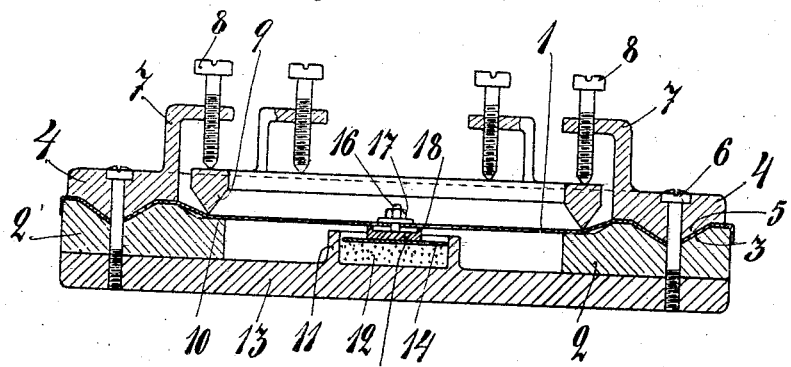
Figure 2:
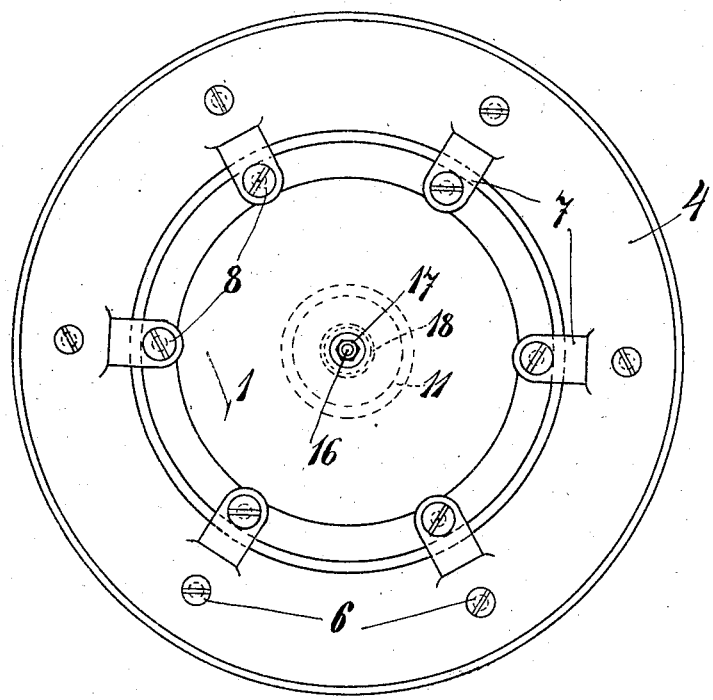

Figure 1 is a vertical section and Fig. 2 is a plan view of a transmitter arranged in accordance with this invention.

1 is the diaphragm and 2 is a ring shaped support for the same. The said ring 2 is provided in its outer surface at the periphery with a groove 3, extending around the ring and preferably tapering inward. On the diaphragm mounted on the ring 2 a ring 4 is mounted, provided on its inner side with a wedge shaped projection 5, which extends around the ring and the shape of which corresponds to the shape of the groove 3. The said ring 4 is fixed to the ring 2 by means of screws 6, upon the tightening of which the ring 4 forces the edge of the diaphragm into the groove 3, the diaphragm being thus rigidly jammed between the rings 2 and 4. The ring 4 has a suitable number of arms 7 extending inward and provided with screw-bolts 8. A frame or ring 9, preferably wedge shaped in cross section, is mounted inside the ring 4, and bears against the diaphragm. The said ring 9 is acted upon by the screw-bolts 8 and by tightening the said screw-bolts the ring 9 is caused to force inward the part of the diaphragm located inside the rings 2 and 4. In this manner the diaphragm 1 is strained with substantial uniformity, from the center radially toward the periphery, in all directions. In order that the position of the diaphragm thus strained may be fixed, the ring 2 has a plane surface 10 at its inner edge and the ring 9 is forced inward by means of the screw-bolts 8, until the diaphragm bears against the said plane surface and assumes the position shown in Fig. 1. The said plane surface 10 need not necessarily extend around the whole ring 2 but may be provided only at the screw-bolts 8. The diaphragm thus strained may be extremely thin, owing to which fact the sensibility of the transmitter is increased.

11 is the cell of the transmitter and 12 are the carbon granules of the same.

As stated above, the greatest vibrations are effected at the center of the diaphragm. In order that all the granules 12 of the said cell 11 may control the variations of the current in substantially the same degree, a disk 14, preferably of carbon, is secured to the center of the diaphragm 1, the remaining part of the said disk being free as herein shown. The said disk is secured preferably in the following manner. After a layer of copper or any other metal has been provided on one of the sides of the said disk by precipating, a metal plate 15 is soldered to the same, provided with a screw threaded pin 16, which is passed through an opening at the center of the diaphragm 1. The said plate 15 with the disk 14 is then fixed by a nut 17, mounted outside the diaphragm 1. In order that the disk 14 may be parallel to the diaphragm 1, the disk 15 is provided at its periphery with a flange 18, which is nicely turned and the edge of which bears against the diaphragm. The disk 14 has the same or substantially the same diameter as the cell 11 and is in contact with the carbon granules 12.

Owing to the said arrangement the vibrations at all points of the disk 14 have the same amplitude as the vibrations at the center of the diaphragm 1. Consequently, all granules of the cell will assist in the same degree in varying the current and partly in consequence hereof partly in consequence of the great vibrations of the disk 14 the sound-waves are transmitted into variations of the current in the most effective manner.

The transmitter described above, which is adapted substantially to strong current for wireless telephoning and in which, consequently, regard must be paid to heat generated in the transmitter, has the advantage of the diaphragm being not heated, which heating would result in a considerable lessening of the effect of the transmitter owing to the fact that the straining of the diaphragm is affected. Owing to the heating the diaphragm would expand at its center, the straining of the diaphragm being thus not uniform.

Having now described our invention, what we claim as new and desire to secure by Letters Patent is:

In telephone transmitters especially transmitters for strong current the combination of a diaphragm, strained with substantial uniformity from its center toward its periphery, and a disk or the like, which is fixed to the center of the diaphragm and vibrates throughout substantially its entire area in unison with the vibrations of that part of the diaphragm to which it is secured, the said disk forming one of the electrodes of the transmitter, substantially as described and for the purpose set forth.

In witness whereof, we have hereunto signed our names in the presence of two subscribing witnesses.

CARL EMIL EGNÉR.
JOHAN GUNNAR HOLMSTRÖM.

Witnesses:
CARL FRIBERG,
ROBERT APELGREN